March 8, 1949.    F. F. HANSEN    2,463,870
BAKING PREPARATION AND PROCESS
Filed Aug. 17, 1945
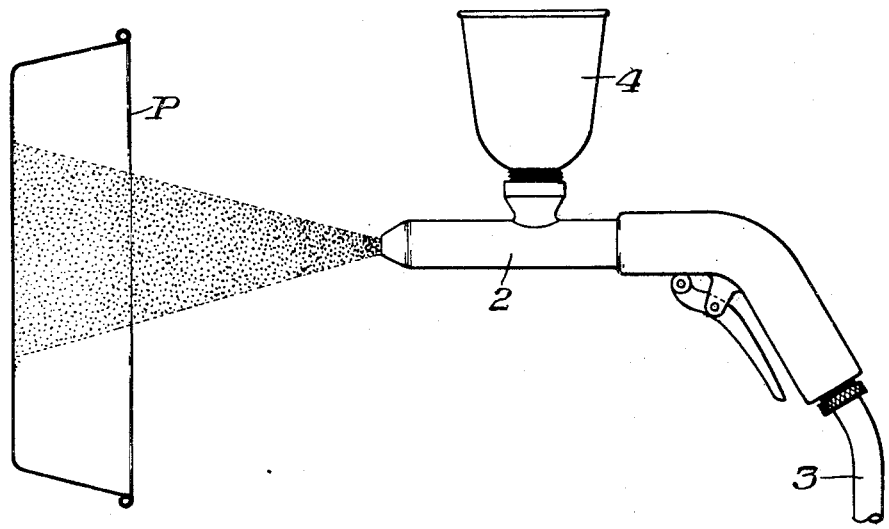
INVENTOR
*Francis Frederick Hansen*
ATTORNEYS Patented Mar. 8, 1949

2,463,870

UNITED STATES PATENT OFFICE 2,463,870

BAKING PREPARATION AND PROCESS

Francis Frederick Hansen, Pittsburgh, Pa.

Application August 17, 1945, Serial No. 611,072

6 Claims. (Cl. 99—118)

This invention relates to the art of baking, and has to do particularly with the greasing of pans and trays and a compound useful for such purpose.

It is general practice in the baking art to "grease" the interior or dough contacting surface of baking pans and trays before depositing the dough thereon, the purpose being to prevent the baked goods from sticking to the pan. Lard or edible vegetable oils is widely used for this purpose, various methods of application being employed, ranging from rubbing a greased cloth over the interior of the pan and the use of spray devices for depositing a mist of melted lard or edible vegetable oil over the interior to fountain brush devices in which the heated lard is supplied to the center of the brush, from whence it works out into the bristles and is, by them, applied to the surface to be coated.

All of these practices have several disadvantages. The soft fatty substances such as lard rapidly become rancid, especially when warm, and in commercial bakeries particularly a residuum of old fat may be mixed with new fat. Any rancidity that develops gives an "off" flavor or odor to the grease, particularly when it is heated, and baked goods are extremely vulnerable and liable to absorb an even slight "off-color," taste or odor. Where brushes are used, they may not be cleaned frequently enough to avoid rancid grease in the bristles and even though cleaned frequently it is difficult to clean them thoroughly. This is especially true of power driven brushes which have to be removed from the greasing machine to clean them.

These greases, moreover, are not always easily spread with sufficient uniformity to avoid sticking of the baked goods. They readily vaporize or sublimate in the oven, recondensing on the exterior of other pans or trays or on the interior of the oven. Where they collect on the exterior of the pans, the pans unless vigorously and thoroughly cleaned—and with tin coated metal pans this is destructive—carbonize and blacken with useage, a carbon deposit gradually building up on the outside thereof. This reduces the thermal efficiency of the pans as heat transmitting diaphragms.

Moreover, lard and like soft fats or oils used for this purpose are apt to oxidize and smoke at baking temperature, creating odors and smells which are driven into and absorbed by the products being baked, often giving to baked goods, especially bread crust, a faintly unpleasant odor and taste which are noticeably objectionable to many people.

The present invention has for its object to overcome the difficulties above noted, and others. This is accomplished by coating the interior of the pans with extremely fine hard fat particles. These hard fat particles are produced by chilling a hard fat and disintegrating it in a hammer mill to a mesh of 200 or finer. By hard fat I mean a substantially completely hydrogenated fat having a melting point of about 135° F. or higher. The hard fat particles may themselves be mixed with very finely ground, 300 mesh or finer, calcium or magnesium stearate. This prevents the fat particles themselves from agglomerating or lumping. Other edible substances may be used in place of the calcium or magnesium stearate.

By this process a better crust is formed on the baked product, particularly from the standpoint of flavor and keeping properties. The hard fat does not readily become rancid, being extremely stable. Because of their higher melting point and higher volatilizing point, they do not smoke or volatilize in the oven. Hence the generation of disagreeable odors which may be absorbed into the bread is avoided and the sublimation or vaporization of the grease, followed by its condensation on the exterior of the pans, does not occur.

My invention may be more fully understood by reference to the accompanying drawing in which the figure is a more or less schematic view of one method of practicing my invention, showing the formation of a cloud of fine hard fat particles directed toward the interior of a pan.

In the practice of my invention, hard fat, by which I mean a fat which is almost, or completely hydrogenated, and which has a melting point of 135° or higher—usually between 135° and 165° F.—is chilled to a condition where it can be disintegrated in a hammer mill to a mesh of 200 or finer, forming tiny discrete hard fat particles. The fine particles may be screened from the over-sized particles by selective separation, or by separators. During this operation, extremely fine ground calcium or magnesium stearate may be mixed with the hard fat particles. This prevents the hard fat particles from lumping or agglomerating, and does not interfere with the property of the hard fat as a lubricant for the pans. Other dry edible powders may be used in lieu of the stearate just mentioned. The preferable percentage of calcium or magnesium stearate is 3% by weight. The calcium and magnesium stearate have a high bulk factor so that a relatively small percentage of weight will serve to protect a substantially large amount of fat particles. The calcium and magnesium stearate is ground to a mesh of 300 or finer.

This preparation of hard fat particles is preferably dispersed into a fine cloud or spray which is directed toward the interior of a pan to be coated and the cloud or spray, which is almost like a fog, will cling to the inside of a pan, the pan being substantially completely coated over its interior. One way of accomplishing this is illustrated in the drawing in which the pan, designated P, is held in front of any suitable spray-forming device 2 supplied with an air hose 3 and having a reservoir 4 for the finely divided fat particles. When the air is caused to flow through the spray device, the fat particles are entrained and discharged into a very fine cloud or spray, as indicated in the drawing. Any suitable arrangement of spray devices and pan supports may be employed, the drawing being schematic to illustrate the principle of my invention. It will be appreciated that the cloud or fog in the present instance is comprised of extremely fine discrete solid fat particles, as distinguished from the former practice of forming a spray from melted lard or grease, which is disintegrated by the air to form a wet mist or tiny droplets.

After the pan has been coated in the manner described the dough is placed in it in the usual manner and baked. As hereinbefore indicated, this hard fat forms an extremely satisfactory lubricant, and one which will not cause the bread to taste or create unpleasant odors which may be absorbed into the bread. The pans will not discolor so rapidly and will be easier to clean. There is no rancidity because of the resistance of the hard fat to become rancid, and because of the fact that no brushes or rags are required, in which stale grease may be mingled with the fresher grease. Moreover, the operation is carried on with the fat in a perfectly cold condition favorable to its preservation, as distinguished from the previous method of having the grease warm and melted—conditions conducive to rancidity.

It will be understood that various changes and modifications may be made in the practice of my invention from that herein specifically described and illustrated, all within the contemplation and scope of the appended claims.

I claim:

1. A composition of matter for greasing baking pans comprising discrete hard fat particles of at least about 200 mesh in fineness mixed with a compound from the group consisting of calcium and magnesium stearate.

2. A composition of matter for greasing baking pans comprising finely divided solid hard fat particles of around 200 mesh and finer stabilized against agglomeration by 3% by weight of a compound from the group consisting of calcium and magnesium stearate.

3. In the art of baking, the process of greasing the pans which comprises exposing the interior thereof to a cloud-like spray of finely divided solid particles of hard fat to coat the interior of the said pans, the particles being of a size not exceeding 200 mesh.

4. A composition of matter for greasing baking pans comprising discrete hard fat particles of at least about 200 mesh in fineness mixed with a compound from the group consisting of magnesium and calcium stearate which prevents the individual particles from agglomerating, the hard fat being substantially completely hydrogenated fat having a melting point of at least 135° F.

5. In the art of baking, the process which comprises chilling a hydrogenated hard fat having a melting point of at least approximately 135 deg. F., comminuting the hard fat while chilled to a particle size not larger than 200 mesh, forming the resulting finely divided particles of fat into a cloud-like dust and directing the cloud-like dust onto the interiors of baking pans until the interiors of the pans are substantially uniformly coated with the resulting substantially atomized particles of the hard fat preparatory to producing baked goods therein.

6. In the art of baking, the process which comprises chilling a hydrogenated hard fat having a melting point from approximately 135 deg. F. to approximately 165 deg. F., comminuting the hard fat while chilled to a particle size not larger than 200 mesh, separating over-sized particles from the resulting fine particles, adding to the comminuted hard fat during the separation of the over-sized particles a stearate selected from the group consisting of calcium stearate and magnesium stearate, the said stearate having a particle size not larger than substantially 300 mesh, the stearate being added to the finely comminuted hard fat particles to a concentration of approximately three per cent of stearate in the hard fat particles, forming the resulting mixture of finely divided hard fat particles and stearate particles into a cloud-like dust, and directing the cloud-like dust onto interiors of baking pans until the interiors of the pans are substantially uniformly coated with the resulting substantially atomized particles of the mixture of hard fat and stearate preparatory to producing baked goods therein.

FRANCIS FREDERICK HANSEN.

REFERENCES CITED

The following references are of record in the file of this patent:

UNITED STATES PATENTS

| Number | Name | Date |
|---|---|---|
| 1,483,704 | Wilcox | Feb. 12, 1924 |
| 2,234,484 | Weinig | Mar. 11, 1941 |
| 2,288,409 | Lippmann et al. | June 30, 1942 |